(12) United States Patent
Iftime et al.

(10) Patent No.: US 11,067,514 B2
(45) Date of Patent: Jul. 20, 2021

(54) ENVIRONMENTAL SENSOR

(71) Applicants: PALO ALTO RESEARCH CENTER INCORPORATED, Palo Alto, CA (US); XEROX CORPORATION, Norwalk, CT (US)

(72) Inventors: Gabriel Iftime, Dublin, CA (US); Jessica Louis Baker Rivest, Palo Alto, CA (US); George A. Gibson, Fairport, NY (US); Eric Cocker, Redwood City, CA (US); Mahati Chintapalli, Mountain View, CA (US); Quentin Van Overmeere, Mountain View, CA (US)

(73) Assignees: PALO ALTO RESEARCH CENTER INCORPORATED, Palo Alto, CA (US); XEROX CORPORATION, Norwalk, CT (US)

( * ) Notice: Subject to any disclaimer, the term of this patent is extended or adjusted under 35 U.S.C. 154(b) by 289 days.

(21) Appl. No.: 15/849,096

(22) Filed: Dec. 20, 2017

(65) Prior Publication Data
US 2019/0187062 A1 Jun. 20, 2019

(51) Int. Cl.
G01N 31/22 (2006.01)
G01N 21/78 (2006.01)
B82Y 30/00 (2011.01)
G01N 21/77 (2006.01)

(52) U.S. Cl.
CPC ............ *G01N 21/78* (2013.01); *B82Y 30/00* (2013.01); *G01N 31/224* (2013.01); *G01N 2021/7796* (2013.01)

(58) Field of Classification Search
CPC combination set(s) only.
See application file for complete search history.

(56) References Cited

U.S. PATENT DOCUMENTS

| | | | |
|---|---|---|---|
| 6,303,046 B1 * | 10/2001 | Risen, Jr. | B01J 20/02 106/162.2 |
| 6,495,352 B1 * | 12/2002 | Brinker | C12N 11/14 435/176 |
| 7,897,057 B1 | 3/2011 | O'Connor et al. | |
| 2005/0159497 A1 | 7/2005 | Gauthier et al. | |
| 2005/0186117 A1 * | 8/2005 | Uchiyama | G01N 21/783 422/91 |
| 2006/0104864 A1 | 5/2006 | Fu | |
| 2010/0166604 A1 * | 7/2010 | Lim | G01N 21/253 422/400 |
| 2011/0171066 A1 * | 7/2011 | Captain | D01F 1/04 422/52 |

FOREIGN PATENT DOCUMENTS

EP 2237031 A2 10/2010

OTHER PUBLICATIONS

U.S. Appl. No. 15/728,385, filed Oct. 9, 2017.

* cited by examiner

*Primary Examiner* — Paul S Hyun
(74) *Attorney, Agent, or Firm* — Miller Nash LLP

(57) ABSTRACT

A sensor has a transparent polymer aerogel, and sensing materials dispersed into the transparent, polymer aerogel, where the sensing materials change color in response to environmental conditions. A method of forming a sensor includes providing a substrate, forming a polymer aerogel layer on the substrate, and infusing the polymer aerogel layer with sensing molecules.

16 Claims, 2 Drawing Sheets

ENVIRONMENTAL SENSOR

TECHNICAL FIELD

This disclosure relates to sensors, more particularly to sensors dispersed into polymer aerogels.

BACKGROUND

Colorimetric sensors generally consist of materials that change color based upon detection of a particular chemical or other materials. The resulting color may be compared to a standardized scale of colors that defines concentration or other characteristic of the material. Examples include indicator liquids that may be dropped into the liquid under analysis, coated pieces of papers that are dipped into a material or that directly change color in the presence of specific gases, etc.

Colorimetric sensors allow for a low cost, no power, and portable alternative to complex, power hungry sensing devices. The application of these types of sensors include such examples as responsive packaging, rapid and inexpensive detection of toxic gases and other materials.

Current colorimetric sensors often suffer from slow response and limited detection of trace amounts of contaminants. The degree of color change in current sensors remains too small to be easily seen directly by the human eye when detecting very low concentrations of analytes. This is particularly a problem when detecting highly toxic gases such as toxic industrial chemicals—including ammonia, phosphine—and chemical warfare gases, where early detection at levels well below the lethal or irreversible damage thresholds are required. Detection may rely upon spectroscopes or other expensive detection equipment, eliminating the advantage of no power and low cost.

Printed colorimetric sensors generally result from printing an ink containing the sensing material, a solvent, and a polymer binder, which keeps the sensing material on the substrate once the ink dries. Solvent evaporation produces a dense polymer layer containing sensing molecules. Detection becomes limited to the top surface of the layer because only the top surface sensing molecules receive exposure to the compound being detected. The compound being detecting does not reach sensing molecules in the deeper layers because the polymer binder blocks their access. Further, the polymer binder may affect the visibility of the color change of the sensing materials if it clouds or obscures the color change.

SUMMARY

An embodiment is a sensor that has a transparent polymer aerogel, and sensing materials dispersed into the transparent, polymer aerogel, where the sensing materials change color in response to environmental conditions.

An embodiment is a method of forming a sensor that includes providing a substrate, forming a polymer aerogel layer on the substrate, and infusing the polymer aerogel layer with sensing molecules.

DETAILED DESCRIPTION OF THE EMBODIMENTS

Figure 1:
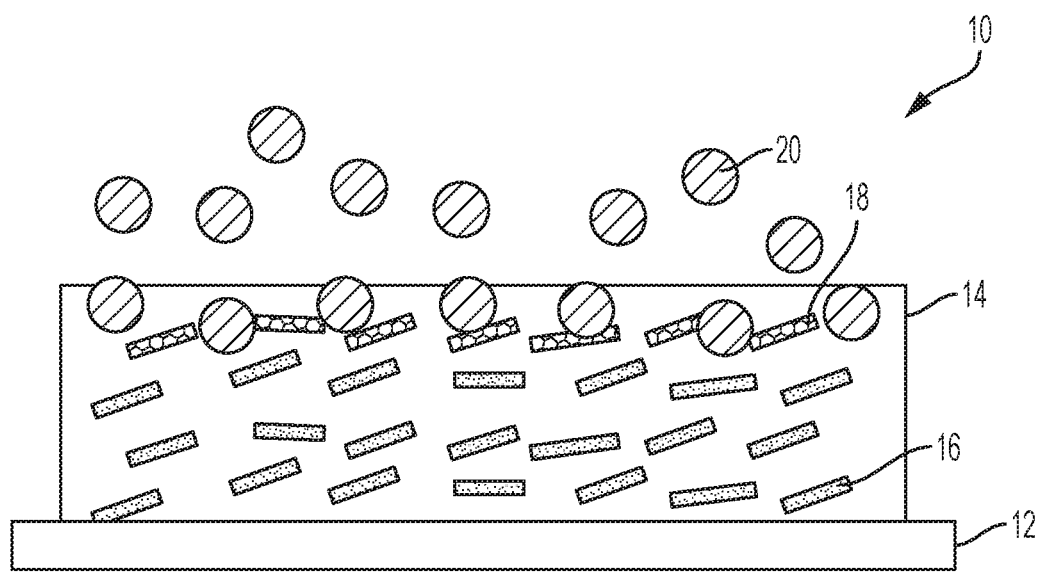
FIG. 1 shows a prior art embodiment of a colorimetric sensor.

FIG. 1 shows an example of a current sensor. The sensor 10 has a substrate 12 and a layer 14 of a polymer binder. The polymer binder 14 generally causes the sensing molecules to remain on the substrate after the solvent has dried. The solvent usually allows the solution of the polymer binder and sensing materials to be thinned to allow their deposition. However, the evaporation of the solvent produces a dense polymer layer.

The dense polymer layer reduces the sensitivity of the sensor, because the target molecules such as 20 typically only reach the top layers 18 of the sensing molecules in the sensor. The lower layers such as that represented by sensing molecule 16 do not encounter the target molecules 20, or encounter them only after a significant delay, as the dense polymer layer serves as a diffusion barrier, inhibiting the target molecules from reaching the lower layers. This reduces the number of active sensing molecules that in turn reduces the amount of coloration obtained by the sensor and delays development of the response. Further, sensing molecules residing deep within the binder are less easy to observe and the scattering, and sometimes outright absorption, of the matrix serve as an optical cloak.

Figure 2:
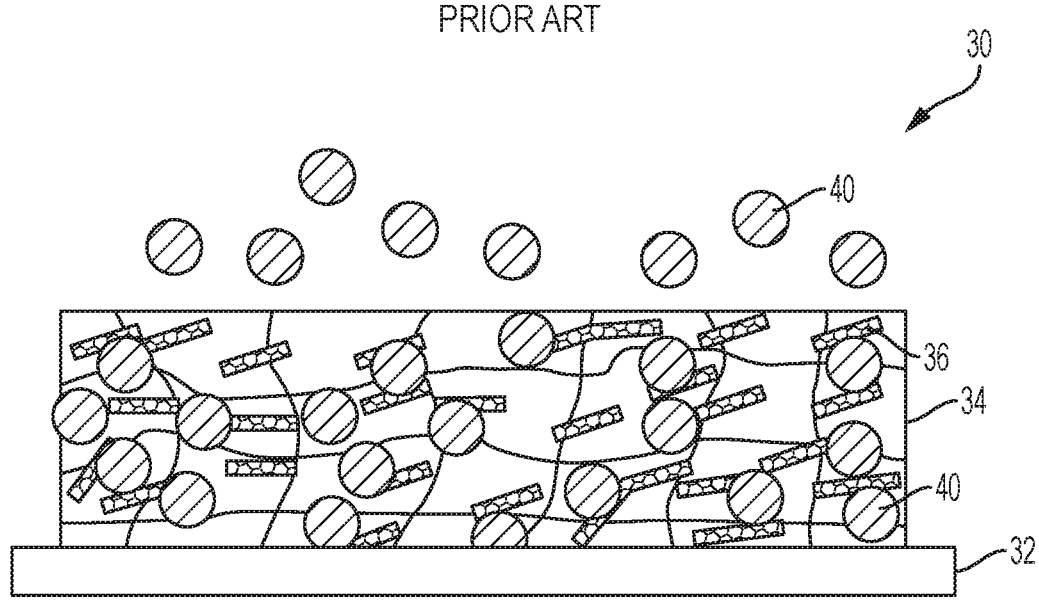
FIG. 2 shows an embodiment of a sensor.

In contrast, FIG. 2 shows an embodiment of a sensor in accordance with the claims presented here. Unlike the dense polymer binder of the current sensors, the embodiments here use a polymer aerogel as a binder. The polymer aerogel has high surface area. The term aerogel, as used here, means a low density, high porosity substance that normally results from removing a liquid component from a conventional gel. In addition, the particular aerogel here has a small pore size, which reduces the likelihood of light scattering. This ensures that the sensor has high transparency, allowing for easier reading of the color changes of the sensing molecules, eliminating the need for expensive, power hungry detection equipment.

As used here, the term high surface area means a material that has a surface area higher than 100 meters squared per gram ($m^2/g$). In some embodiments, the surface area may be in the range of 600-1000 $m^2/g$. The high surface area allows more sensing molecules to attach to the binder, increasing the coloration result.

The aerogels used here result from a process of fabrication in which the pore size is controlled. One such approach is disclosed in U.S. patent application Ser. No. 15/728,385. The control of the pore size may result from the use of chain transfer agents (CTA), stable free radical polymerization process (SFRP), or atom radical transfer polymerization (ATRP). The process of the US Patent Application, use of CTAs, SFPR and ATRP all produce cross-linked polymer aerogels. Reduction of the pore size allows for better optical clarity, and more specifically: higher transparency to light, and lower haze. As used here, 'a low haze' aerogel has a haze of 20% or lower, and a 'transparent' aerogel has a transparency of 50% or higher.

These aerogels typically have a porosity, such as 20% or higher. This allows better penetration of the sensing molecules into the aerogel during fabrication and better penetration of the target molecules being analyzed by the sensor. As shown in FIG. 2, the sensor 30 may include the substrate 32 that may have a layer of the polymer aerogel 34 upon it. Alternatively, upon drying, the polymer aerogel may have sufficient mechanical robustness that it can acts as its own substrate or it can be bonded to a substrate by using an adhesive References to the claims to a substrate, may be to a separate substrate, or a substrate formed of the polymer aerogel. The sensing molecules such as 36 contact the target molecules such as 40 through the thickness of the polymer aerogel, rather than just the top layer. The sensing material may be absorbed into the aerogel material, or it may be adsorbed to the internal surfaces of the aerogel. This allows for better coloration and easier analysis of the sensor's response.

This may also allow for a faster response time. In one experiment, an embodiment of the sensor consisted of a 1 millimeter thick layer of the polymer aerogel having dispersed sensing molecules has a response time of 2 seconds. The response time depends on the amount of time a target molecule takes to travel through the thickness of the polymer aerogel layer and interact with the amount of sensing material required to cause a perceptible change in color. Comparable sensors made with dense polymer binders have a response time of up to a day or longer because of the dense polymer layer.

The sensor of the embodiments here may have much higher sensitivity, which leads to a limit of detection being less than 100 ppm of a target molecule. The sensitivity of the sensor is determined by the change in absorbance due to a change in concentration of the target molecule. The absorbance change is maximized by having a large number of interactions between the target molecule and sensing molecule in a given volume of the sensor. Aerogel sensors have improved sensitivity over dense sensors due to the combination of high internal surface area and high permeability to the target molecule. The high surface area allows for a high loading of the sensing material where it can be easily accessed by the target molecule, and the high permeability of the aerogel allows for a large number of target molecules to enter the volume of the sensor. The transparency and low haze of the aerogel sensor allow a higher number of sensing molecules to be visible per unit of observable area which ensures that coloration change in the depth of the material can be detected by the eye and contributes to the device sensitivity For a dense sensor to achieve the same sensitivity as an aerogel sensor, more sensing material is required. The sensing materials are typically the most expensive component of the sensor. Hence, for the same performance, the cost of an aerogel sensor may be lower than that of a dense sensor.

The sensor may function as an instantaneous, integrating, or threshold sensor, depending on the selection of the sensing material and target. In the embodiment as an instantaneous sensor, the effect of the target on the sensing material is reversible, and the response depends on the instantaneous concentration of the target. In the embodiments as an integrating sensor or threshold sensor, the effect of the target on the sensing material is irreversible, and the response depends on the total concentration of the target over an interval of time. The integrating sensor or threshold sensor may include a means to restore the material to the initial state, through input of energy such as heat, light, or electricity. In such an embodiment, the porous structure of the aerogel would facilitate the reversibility of the state of the sensor, by allowing the target molecule to escape.

The sensor may also have different types of sensing molecules within it. In one embodiment, the sensor may include sensing molecules that change color in response to a first type of target molecule, and sensing molecules of a different type that change color in response to a second type of target molecule. As will be discussed below, arranging different sensing molecules in any desired spatial pattern may produce an array of different types of sensing molecules on the polymer aerogel layer. This may allow for localized regions of different response colors, or different concentrations. In one embodiment, the pattern may be created by printing the sensing material from an ink containing sensing molecules.

In one embodiment, the different concentrations may be of the same material. A more densely populated region of sensing molecules may turn color at lower concentrations of the target molecule than a less densely populated region, providing for high dynamic range.

Figure 3:
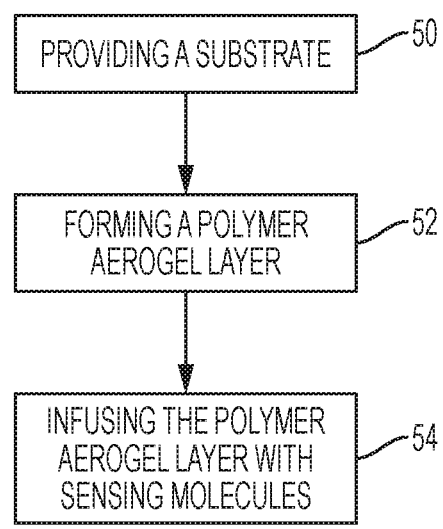
FIG. 3 shows an embodiment of a method of forming a sensor.

FIG. 3 shows an embodiment of an overall process of forming a sensor. In this approach, a polymer gel or aerogel is formed first, and then is infused with the sensing molecules by placing it in a solution containing sensing molecules. At 50, a substrate is provided. As mentioned above, the substrate may consist of the layer of polymer aerogel itself, or it may be a temporary substrate that is coated with the polymer gel prior to removal of the liquid to form the aerogel. At 52, the process forms the porous polymer layer. Two methods are useful for the purpose of the embodiments here. First, the polymer aerogel is formed by removal of the liquid component of a polymer gel, providing a dry polymer aerogel at the end of 52. A second approach consists in exchanging the reaction solvent with a different one and keep the polymer gel in solution to provide a wet polymer gel at the end of 52.

In one embodiment, the polymer aerogel results from a process of polymerization of vinyl radical polymerizable monomers in the presences of a radical initiator in a compatible solvent. At 54, the polymer aerogel is infused with the sensing molecules.

The infusion may result from many different processes. In one embodiment, the porous polymer substrate may soak in a solution of the sensing material mixed with a solvent. Upon drying, the resulting layer may consist of a layer of polymer aerogel having molecules of the sensing material dispersed throughout it.

Alternatively, the solution of sensing material and solvent may be printed on the polymer aerogel layer, causing it to soak into the porous aerogel. When the solvent evaporates, the sensing material will have dispersed through the polymer aerogel layer.

In another embodiment, the sensing molecules may be present in the solvent at the time of polymer gel formation from polymer precursors. This approach may fix the sensing molecules into the polymer walls of the aerogel with the benefit of enhanced temporal, and chemical stability of the sensing layer because if eliminates or limits the leaching out of the sensing molecule.

In another embodiment, infusing the polymer aerogel layer with sensing molecules comprises chemically grafting the sensing molecules onto polymer walls during or after the forming of the polymer aerogel.

In another embodiment, wherein infusing the polymer aerogel layer with sensing molecules comprises copolymerizing sensing molecules containing polymerizable functional groups with polymer aerogel monomers during the forming of the polymer aerogel.

Having reasonable compatibility between the sensing molecules and the polymer material may maximize the sensing material absorption within the aerogel pores. In some embodiments, the sensing molecule may consist of a polar molecule that changes color in the presence of the target molecules that make up the compound of interest that is highly polar such as an amine or an organic acid. In this case, the polymer structure may require polar groups to be present for wetting/compatibilization to maximize the incorporation of the sensing molecule into the polymer aerogel.

A typical example that fits this category of sensing molecule/polymer material consists of pH responsive molecules. In other embodiments, the molecules of interest are non-polar, such as ethylene detected as a result of fruit decay. The sensing molecules in this embodiment may have low polarity and the polymer material may have low polarity as well.

Some monomers consist of polymerizable groups and of additional functional groups to enable compatibilization with the sensed compound of interest. Suitable radical polymerizing groups include vinyl, acrylate, and methacrylate groups. Suitable polar groups for compatibilization include alcohol (—OH), amine (primary, secondary or tertiary, —$NH_2$; —NHR and —$NR_2$) acid groups (ex. carboxylic acid groups (—COOH) and sulfonic acid (—SO3H). Non polar compatibilizing groups include aryl (such as phenyl groups), alkyls and combinations.

Some free radical initiators may include AIBN, BPO and analogues. Some possible solvents include solvents compatible with polar monomers include DMF, N-methylpyrrolidone, ethanol, glycol, etc. Solvents compatible with non-polar monomers include toluene, xylene and analogues. Chain transfer agents for pore size control include thiols such as dodecanethiol and 4-methylbenzenethiol, halocarbons such as carbon tetrachloride and bromotrichloromethane, and pentaphenylethane. SFRP pore size control agents include stable nitrogen stable free radicals such as TEMPO, 4-hydroxy-TEMPO, TIPNO, and SG1.

Sensing molecules may consist of a wide range of sensing molecules that have been demonstrated in the prior art with either liquid solutions or with dense polymer films. In many cases, one class of sensing molecule can be used for multiple types of sensors. The main classes include pH indicators that change color as a function of the pH change due to variation of the acid/base environment around the sensors that can indicate the presence of volatile acids, including organic acids, and organic amines. One main application is related to the fabrication of sensors for fish and meat freshness. Spoiled meat emits volatile organic amines Examples of sensing molecules in this class include phtalocyanine, and bromocresol green.

The main classes also include aggregated organic and organometallic dyes that change color due to changes in energy gaps between electronic states in absorbance as the distance between neighboring molecules change. These may also indicate temperature, humidity (RH) or intercalation of contaminants. Examples include phtalocyanine dye, porphyrin dyes, indigo derivatives, azo dyes, anthraquinone dye, triarylmethane dye etc.

The main classes may also include: excimers such as fluorescent and phosphorescent dyes; thermochromics that undergo controlled chemical or physical changes from a colorless state to a colored state; and metal nanoparticles with surface plasmon resonances that change in response to the presence of a target molecule. Examples include leuco dyes, cholesteric liquid crystals, and gold nanoparticles.

The active sensing material from the main classes may consist of small molecules, nanoparticles, or macromolecules with color-changing repeat units. A small molecule contains one active molecule and may have a molecular weight of up to 500 Daltons. Macromolecules contain more than one repeat units containing the active sensing molecules and have a molecular weight higher than 500 Daltons.

Other examples include transition metal salts that coordinate evolved gases. Typical sensing materials include palladium chloride, palladium sulfates, ammonium molybdates, potassium permanganate. An example is the ethylene sensor that changes color due to the emission of ethylene gas as the fruit ripens and gets eventually spoiled. The change in light transmittance, reflection, absorption or fluorescence of the sensing material ranges preferentially in the near ultraviolet to near infrared range (200 nanometers to 2000 nanometers). In different embodiment, the changes take place in a range from near ultraviolet to visible range (<730 nm) of the light spectrum.

Once available these sensors make possible multiple applications. Depending on the specific chemistry, these sensing molecules can be incorporated in sensors for various applications, including threshold temperature where the sensor undergoes a permanent color change when exposed to temperatures above or below some designed limit. For example, the sensor ensures that a perishable, temperature-sensitive item such as a vaccine is maintained below a certain temperature during transport and/or storage.

Another application may consist of sensors for fish and meat freshness where the sensor changes color based on ambient levels of chemicals given off during decay process such as putrescine (tetramethylenediamine) and cadaverine (pentamethylenediamine). Grocery stores could deploy a sensor that sits next to or on meat product and changes color to indicate that the meat has been left out or in the refrigerator for too long. Another food application may involve sensors for fruit ripeness where the sensor changes color based on ambient levels of chemicals given off during ripening process, such as ethylene. A sticker on fruit contains a fruit ripeness sensor along with a color scale that maps color to estimated time before ripeness, allowing a customer to choose the fruit that will be optimally ripe when they plan to eat it.

Another application may monitor relative humidity where the sensor undergoes a permanent color change when exposed to ambient relative humidity levels above or below some designed limit or based on the aggregate amount of water vapor adsorbed, such as by integration of relative humidity over time. The container for a chemical ingredient that inactivates when exposed to water vapor contains a sensor of the latter description that indicates when the contained chemical is no longer suitable for use and needs to be replaced.

Hazardous gas/material exposure in which a sensor undergoes a color change based on ambient level of a hazardous chemical. Sensors placed on natural gas infrastructure equipment that changes color under exposure to hydrogen sulfide, which can be present in natural gas in high concentrations, to warn workers of potentially toxic natural gas leaks in equipment. There may be defense applications for ensuring safety in cities against chemical warfare agents.

Another application includes use of these sensors as a pollution sensor where the sensor undergoes permanent color change based on aggregate exposure to some pollutant. Sensors could reside in streams and rivers that change color based on exposure to copper or heavy metals to monitor injection of these pollutants by some upstream agent, such as a factory.

Another application may consist of leak detection on the outside of a container where the contents may not be toxic, but it may be important to know if there's a leak. An example of such an application is a hydrogen leak warning sticker on the outside of a gas cylinder. While not a pollution sensor, similar sensors may be used to detect oxygen levels, $CO_2$ levels or time and temperature indicators.

sensing labels and sensing strips with enhanced coloration of the above embodiments have several advantages when compared to commercial sensors currently available. These advantages include increased sensitivity for trace detection, decreased response time, and increased dynamic range.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A sensor, comprising:
a transparent, cross-linked, polymer aerogel having polymer walls and a porosity of 20 percent or higher; and
an array of sensing materials dispersed into the transparent, polymer aerogel and fixed into the polymer walls where the sensing materials change color in response to environmental conditions.

2. The sensor in claim 1 wherein the environmental conditions comprise a presence of target chemical compounds.

3. The sensor of claim 2, wherein the sensor is capable of detecting a concentration of less than 100 ppm for a target molecule.

4. The sensor of claim 2, wherein the sensing materials comprises a mix of different types of sensing molecules, where each type of sensing molecule responds predominantly to a different type of the target molecules.

5. The sensor of claim 1, wherein the transparent, polymer aerogel has a specific surface area higher than 100 meters squared per gram.

6. The sensor of claim 1, wherein the transparent, polymer aerogel has a specific surface area in the range of 600 to 1000 meters squared per gram.

7. The sensor of claim 1, wherein the transparent, polymer aerogel has a haze of 20 percent or lower.

8. The sensor of claim 1, wherein the polymer aerogel has a light transmittance of 40 percent or higher in the wavelength range of relevance for the sensing materials.

9. The sensor of claim 1, wherein the sensing materials respond to the presence or absence of environmental conditions by a change in light transmittance, reflection, absorption, or fluorescence.

10. The sensor of claim 9, wherein the change in light transmittance, reflection, absorption or fluorescence of the sensing materials ranges occurs in the near ultraviolet to near infrared range.

11. The sensor of claim 1, wherein the sensing materials consist of one of small molecules, nanoparticles, or macromolecules with color-changing repeat units.

12. The sensor of claim 1, wherein the polymer aerogel results from stable free radical polymerization.

13. The sensor of claim 1, wherein the polymer aerogel results from use of a chain transfer agent.

14. The sensor of claim 1, wherein the polymer aerogel results from atom radical transfer polymerization.

15. The sensor of claim 1, wherein the sensing materials change color in response to environmental conditions, by changing a fluorescent response.

16. The sensor of claim 1, wherein one or more of the sensing materials is a pH indicator.

* * * * *